United States Patent Office 2,891,779
Patented June 23, 1959

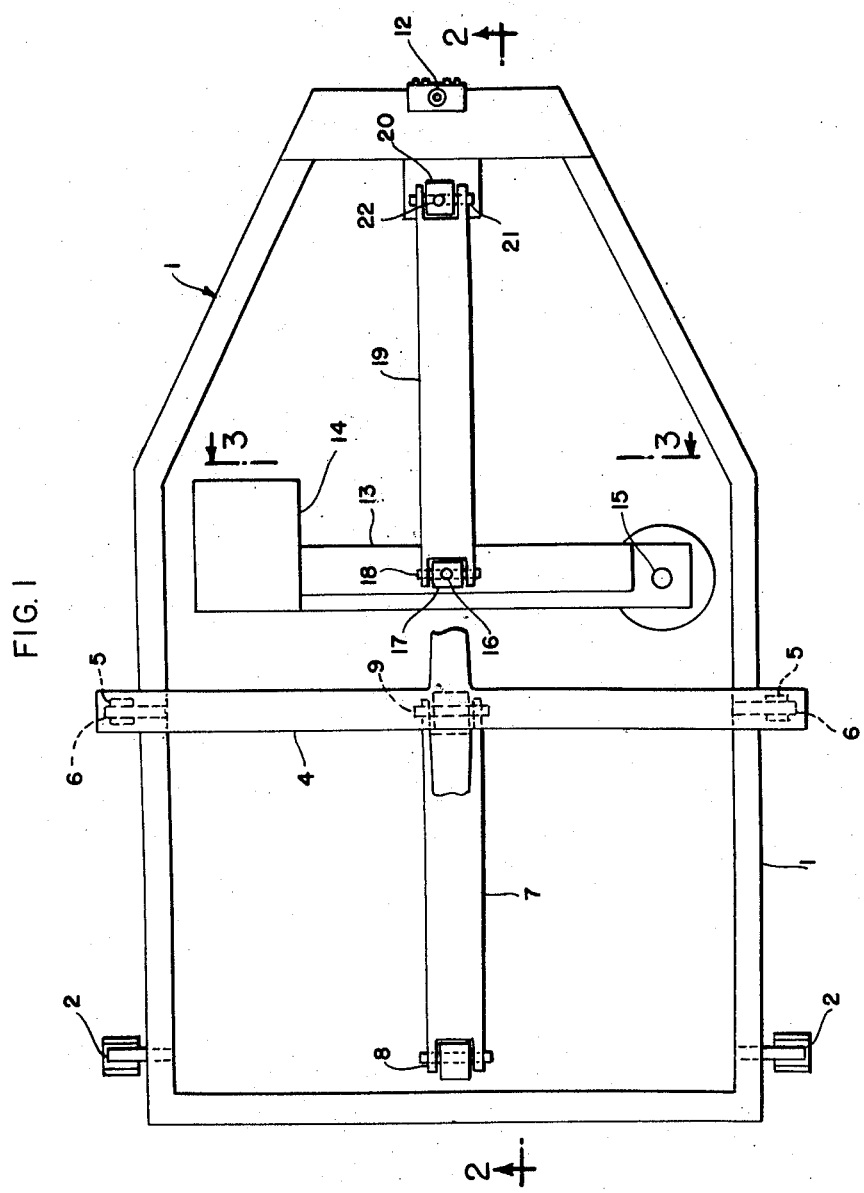

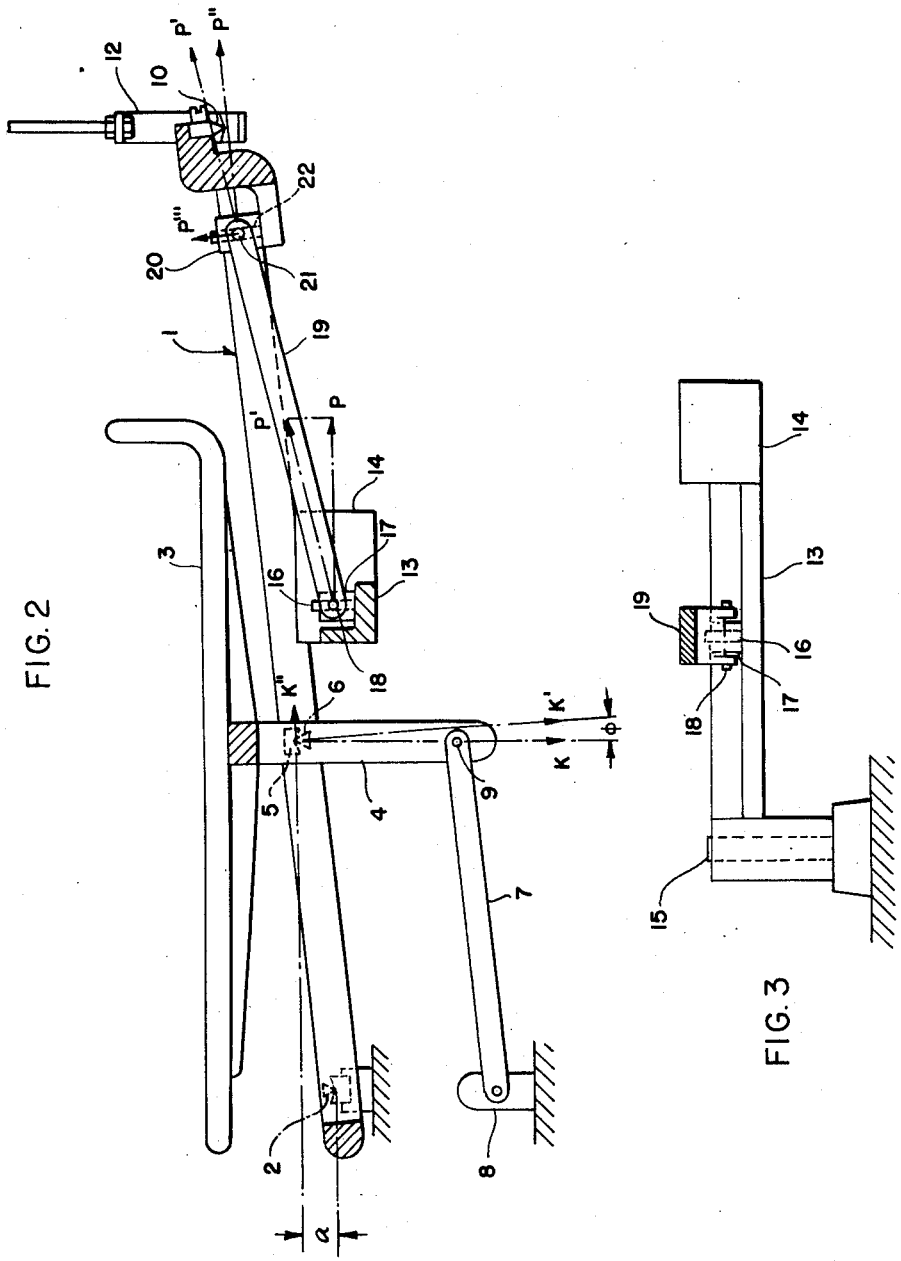

2,891,779

COMPENSATING DEVICE FOR WEIGHING APPARATUS

Adrianus van Duyn, Hillegersberg, Rotterdam, Netherlands, assignor to U.S. Slicing Machine Company, Inc., La Porte, Ind., a corporation of Indiana Application December 2, 1954, Serial No. 472,681

Claims priority, application Netherlands January 27, 1954

5 Claims. (Cl. 265—49)

This invention relates to scales and weighing apparatus generally, and more particularly it relates to a device for compensating weighing error which may be introduced due to a scale being set in a tilted position.

In general, weighing apparatus should be designed for use in a normal position, and an inclined or tilted position is only an exceptional condition which may be encountered because of inadvertence or because a platform or base is not sufficiently rigid to properly support the apparatus. Any compensating device should be operative when the scale becomes tilted but should not influence the readings or indications thereof when the scale is properly positioned.

It is an object of this invention to provide weighing apparatus which is self-compensating to yield a true reading or indication regardless of the normal or inclined positioning thereof.

It is a further object to provide a simple, economical device which may be incorporated into a lever type scale, and which will compensate for weighing error resulting from a tilted or inclined positioning of said scale.

According to this invention, a compensation pendulum is mounted to pivot about a normally vertical axis, and exerts a force corresponding to the amount of tilt of its axis from a true vertical line. A linkage member conveys this force to the lever of the scale where a moment of force is developed that cancels a moment of force introduced upon the lever due to a tilted positioning of the scale.

It will be appreciated that a pendulum is a lever which is weighted at one end and pivotally mounted at the other. A pendulum may be mounted to pivot about a vertical axis as is the compensation pendulum of this invention.

A more complete understanding of the present invention, its mode of operation and its advantages may be gathered from further reading of this specification together with an inspection of the accompanying drawings, in which:

Figure 1 is a plan view of a scale using this invention wherein the weighing platform has been removed to show the underlying structure;

Figure 2 is a view of the section along the line 2—2 of Figure 1; and

Figure 3 is a view of the section along the line 3—3 of Figure 1, which illustrates the compensation pendulum in detail.

In the various figures of the drawings the same elements are designated by the same reference numerals.

Referring again to the drawings, but in more detail, there is shown the weighing apparatus which comprises a lever structure 1 pivotally mounted on knives 2 mounted in knife bearings supported on a frame. A weighing platform 3 (omitted from Figure 1 for the sake of clearness) rests on a platform carrier 4. This carrier in turn rests at its ends upon knife bearings 5 and thence upon the lever structure 1 which supports the knives 6.

A push-pull link 7 is rotatable about one end about a fixed pivot 8 carried by the frame. At the other end of the link 7 is a pivot 9 attaching it to the platform carrier 4. The platform carrier 4 is thereby guided and held in a normally vertical position.

The lever structure carries a knife 10 at its end which operates on a pull link 12. This link 12 leads to an equilibrium member which may be a pendulum, a spring, or a lever having a poise or slidable weight. As a choice of equilibrium members is not a part of this invention, none have been shown on the drawing.

The weight of the load which may be placed upon the platform 3, combined with the weight of the platform and of the platform carrier, is exerted upon the knife bearings 5 and thence upon the lever 1. The weight is always vertically directed regardless of the position of the weighing apparatus, and for a proper understanding of this invention it will be assumed that the weighing apparatus is in a tilted position. The weight would normally appear as a force K, Figure 2, but with the assumed tilted position of the scale, the weight appears as a force K' having an angle $\phi$ between the normal vertical of the scale structure and the true vertical. Since the angle $\phi$ is small, cosine $\phi$ will be assumed equal to one, and the force vector K' will be practically equal to the force vector K. The weighing error is introduced because a component of force K'' is created in a direction perpendicular to the vector K. This component of force K'' is applied to the lever 1 with a moment arm having dimension $a$. As shown in Figure 2, the moment of force thus resulting will tend to cause clockwise rotation of the lever 1 and thereby to increase the indication of the weighing apparatus somewhat. The amount of the moment of force depends upon the angle $\phi$ between the vector K' or true vertical and the vector K which lies along the axis of the platform carrier 4 in the direction normally vertical. The moment also depends upon the amount of deviation of the lever 1 which in turn depends upon the loading of the scale and determines the length of the moment arm $a$.

The device for compensating for this weighing error comprises a pendulum 13 having a weight 14, which pivots about a vertical axis 15 on the frame. The pendulum carries a vertical pin 16 to which a block 17 is pivoted. This block is provided with a horizontal pin 18, to which a link 19 is pivoted. The other end of this link is pivotally connected to a block 20 by a horizontal pin 21 which in turn is rotatable about a vertical pin 22 mounted upon the weighing lever 1. It will be appreciated that the parts 16, 17, and 18 on one end of the link 19, and the parts 20, 21, and 22 at the other end of the link, each form a universal coupling. It is not necessary that the pins 16 and 18 at one end, and the pins 21 and 22 at the other end of the linkage member 19, be intersecting.

To continue our assumption that the weighing apparatus lies in a tilted position and that gravity works along the direction of the vector K', it may then accordingly be assumed that the pendulum weight 14 will exert a pressure to the right (in Figures 1 and 2) and a force P will be exerted against the linkage member 19. The universal coupling of parts 20, 21, and 22, takes a component of force P' and transmits it to the lever 1. The force P' may be resolved into two forces, P'' and P''', at the point of universal coupling 20, 21, and 22, joining the lever 1. The component of force P'' acts along the axis of the lever 1 and therefore has no influence on its equilibrium position. However, the component of force P''' acts in a direction perpendicular to the lever and tends to rotate the lever in a counterclockwise direction. This counterclockwise moment of force tends to counteract or cancel the clockwise moment of force which was applied to the lever by the vector K' operating at the moment arm of $a$, and therefore the weighing error introduced because of the tilting of the weighing apparatus is now counteracted by the force exerted from the pendulum 13 through the linkage 19.

By a choice of a pendulum weight 14, the rotation axis 15 and the dimensions of the pendulum and the point of linkage 16, 17, and 18, the error due to the tilted position may be minimized for all of the loadings within the weighing range of the apparatus. It will be further appreciated that other constructions are possible whereby the weight of the pendulum may be conveyed to the lever arm 1 or to other working parts of the apparatus such as a connection to the push-pull link 12 or to the equilibrium member connected thereto.

The invention provides an efficient operating mechanism for scales to provide proper reading should the scale be tilted or whether it is in its normal straight, horizontal position. The device of the invention is simple in construction and may be very economically manufactured.

Changes may be made in the form, construction and arrangement of the parts without departing from the spirit of the invention or sacrificing any of its advantages, and the right is hereby reserved to make all such changes as fall fairly within the scope of the following claims.

What is claimed is:

1. A weighing scale comprising a frame, a lever structure mounted to pivot on said frame about a horizontal axis, a counterbalance pull member operating on said lever structure, a platform for supporting a substance to be weighed, a platform carrier supporting the platform, bearing means on the lever structure and on the platform carrier for exerting the weight of the substance to be weighed upon the lever, a link pivotally connected to the platform carrier and said frame for holding the platform carrier in a normally vertical position on the bearing means, a pendulum mounted on said frame to pivot about a normally vertical axis, and a linkage member coupled between the pendulum and the lever, said linkage member being angularly positioned relative to said pull member said pendulum being operative to develop a force in accordance with a tilted positioning of the weighing scale and said linkage member being operative to transmit the force from the pendulum to the lever and to develop a moment of force in the lever to counteract another moment of force developed due to the platform carrier being tilted from a true vertical position.

2. A weighing scale according to claim 1 wherein the linkage member is connected to the pendulum by a universal coupling and is connected to the lever by another universal coupling whereby only a component of force acting longitudinally with the linkage member is transmitted from the pendulum to the lever.

3. In a weighing apparatus, a frame, a lever structure pivotally mounted on said frame at one end about a horizontal axis and having a counterbalance pull member operating on the other end thereof, a platform carrier bearingly supported on said lever structure, a link pivotally connected at one end to said platform carrier and at the other end to a fixed pivot on said frame for maintaining said platform carrier in a normally vertical position, a platform supported on said platform carrier and adapted to support a substance to be weighed, a device operative to compensate for weighing errors resulting from tilting of said weighing apparatus, said device comprising a pendulum connected to said lever at said counterbalance pull member and pivoted about a vertical axis on said frame which transmits force thereto corresponding to the amount of tilt of said weighing apparatus which force develops a moment of force on the lever structure that cancels the moment of force introduced upon the lever due to a tilted positioning of said weighing apparatus which would normally act on said counterbalance pull member to give an erroneous weight reading.

4. In a weighing apparatus, a frame, a lever structure pivotally mounted on said frame at one end about a horizontal axis and having a counterbalance pull member operating on the other end thereof, a platform carrier bearingly supported on said lever structure, a link pivotally connected at one end to said platform carrier and at the other end to a fixed pivot on said frame for maintaining said platform carrier in a normally vertical position, a platform supported on said platform carrier and adapted to support a substance to be weighed, a device operative to compensate for weighing errors resulting from tilting of said weighing apparatus, said device comprising a pendulum mounted on said frame to pivot about a normally vertical axis, and a linkage means interconnecting the pendulum intermediate its ends to said other end of the lever structure, said linkage means including a link, a first universal coupling connecting one end of the link to the pendulum and a second universal coupling connecting the other end of the link to the lever structure, whereby tilting of said weighing apparatus develops a first moment of force in said lever structure to rotate same in one direction about its pivotal mounting and develops a moment of force in said pendulum which is transmitted to said lever structure through said link thereby developing a second moment of force in said lever structure substantially equal to said first moment of force but in the opposite direction thereby compensating for any error normally developed in tilting said apparatus.

5. In a weighing apparatus, a frame, a lever structure, means for pivotally mounting one end of said lever structure on a horizontal axis on said frame, a counterbalance pull member attached to the other end of said lever structure, a platform adapted to support the substance to be weighed bearingly carried on said lever structure, a device operative to compensate for weighing errors resulting from tilting of said weighing apparatus, said device comprising a pendulum, means mounting said pendulum to pivot about a normally vertical axis on said frame, a link extending between an intermediate point on said pendulum and the end of the lever structure having the counterbalance pull member attached thereto, a first universal coupling between said pendulum and one end of said link, and a second universal coupling between said lever structure and the other end of the link, whereby any moment of force developed on said lever structure resulting of tipping of said weighing apparatus will be canceled by a moment of force in the opposite direction on said lever structure which is developed initially by said pendulum and transmitted to said lever structure through said link.

References Cited in the file of this patent

UNITED STATES PATENTS

| 833,874 | Cochran et al. | Oct. 23, 1906 |
| 1,683,861 | Cameron | Sept. 11, 1928 |
| 1,838,019 | Gilbert | Dec. 22, 1931 |
| 2,090,288 | Eschenbacher et al. | Aug. 17, 1937 |
| 2,190,959 | Von Thyssen-Bornemisza | Feb. 20, 1940 |
| 2,296,330 | Blau | Sept. 22, 1942 |
| 2,368,010 | Eash | Jan. 23, 1945 |
| 2,602,659 | Williams | July 8, 1952 |

FOREIGN PATENTS

| 516,172 | Great Britain | Dec. 27, 1939 |